UNITED STATES PATENT OFFICE.

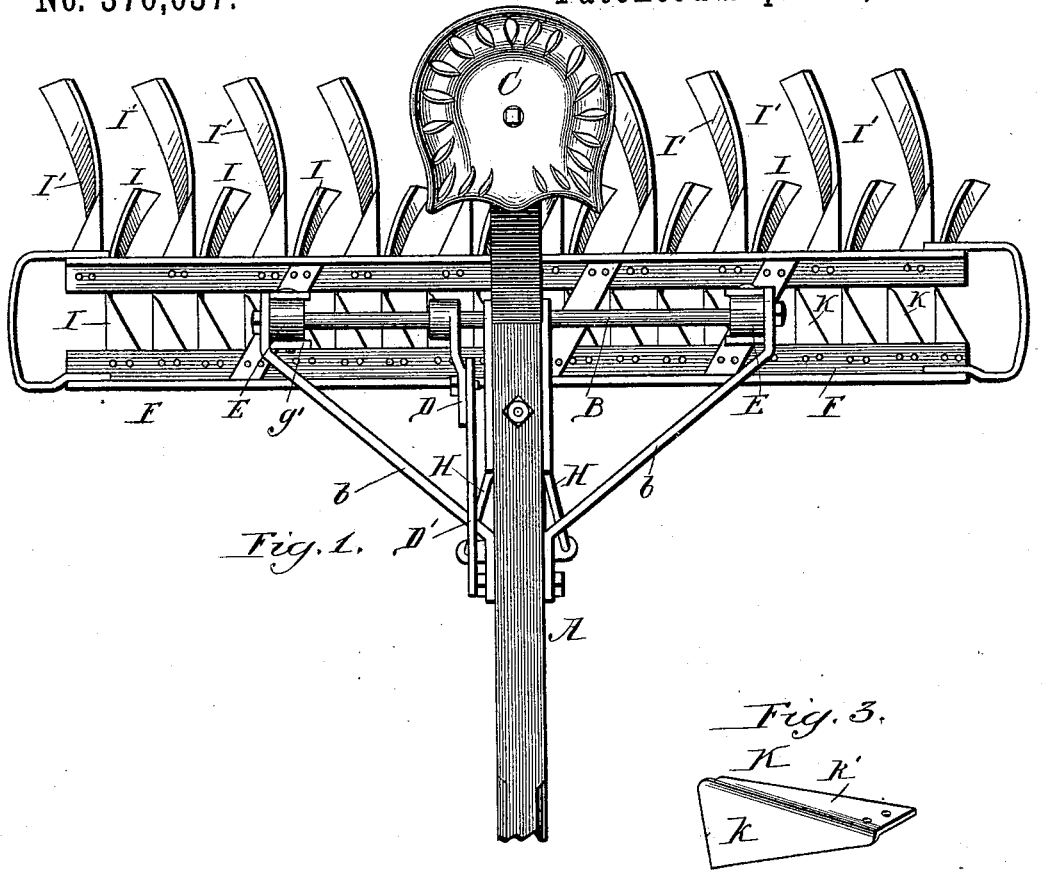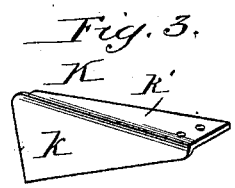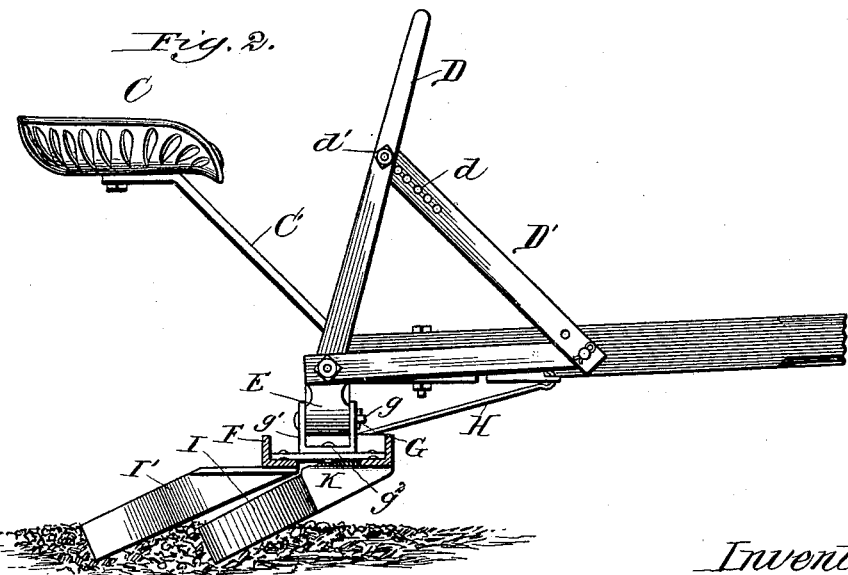

JOHN T. BELL AND SEBASTIAN RITTY, OF DAYTON, OHIO, ASSIGNORS TO THE OHIO RAKE COMPANY, OF SAME PLACE.

HARROW.

SPECIFICATION forming part of Letters Patent No. 370,037, dated September 20, 1887.

Application filed July 23, 1886. Serial No. 208,891. (No model.)

*To all whom it may concern:*

Be it known that we, JOHN T. BELL and SEBASTIAN RITTY, citizens of the United States, residing at Dayton, in the county of Montgomery and State of Ohio, have invented certain new and useful Improvements in Harrows, of which the following is a specification.

Our invention consists in the provision of clod-cutters, as distinguished from crushers, between the teeth forming the gang in a single-rank, or the front gang in a double-rank harrow, irrespective of the specific form of such cutters.

For the purpose of illustrating our invention we have adopted a swivel-headed harrow made the subject of Letters Patent No. 338,531, granted to W. J. Lane, March 23, 1886, and will describe the improvement as applied to such harrow, but without intending in anywise to be limited to its use in that type alone.

In the drawings, Figure 1 is a top plan view of a double-rank Lane harrow embodying our invention; Fig. 2, a side elevation, and Fig. 3 an enlarge detail of the cutter detached.

A represents the pole or draft-tongue, journaled at its rear end upon the transverse shaft B, and also braced therefrom by means of hounds b, which run to the ends of the shaft and are held thereto by means of suitable nuts. The usual seat, C, is carried upon the standard C', rising from the rear end of the tongue, and a lever, D, bolted to the transverse shaft, extends into such relation to the seat as to be readily grasped by the driver in order to rock said shaft, which lever is held in the desired adjustment by any suitable means, herein denoted by the link D', pivoted to the draft-tongue, and having at its upper or free end a series of holes, d, through which a bolt, d', from the lever may be passed and secured by a key.

From each end of the transverse shaft depends a bracket, E, supporting the corresponding gang-bar head or frame, F, by means of a swivel-joint, G, such joint being composed of a pivot, g, passing through the bracket parallel with the line of draft and supporting the U-coupling g', and of a second vertical pivot, g², passing through the bottom of this coupling and through one of the cross-bars of the frame, thus permitting to the frame a movement on these pivots in two planes, a third movement being imparted by the rocking of the shaft.

Rods H, are provided, whereby the gang-bar frames, which, it will be remembered, are divided in the center, may be held at right angles to the line of draft when working, or parallel with said line of draft when out of action for transportation.

As thus far described the machine does not differ from the before-mentioned patent granted W. J. Lane.

I represents the harrow-blades of the front rank or gang and I' those of the rear rank. The blades of the front rank are bent laterally and slightly twisted and the upper edge or end bent over horizontally, or at right angles to the plane of the main part, to afford means of attachment to the front gang-bar and to brace the blade. Those of the rear rank are similarly constructed, except that they are reversed and extend sufficiently to the rear to obtain a marked degree of elasticity. They are set alternately with those of the front rank, which come underneath them to about half their length. Now, the clod-cutter which we propose to employ is most conveniently and economically formed from a single piece, K, of metal, stamped, forged, or otherwise wrought into shape, as indicated by the detached view —that is to say, it has a triangular blade or body, k, in a vertical plane, the inclined front or cutting-edge of which extends downward in line practically parallel with the forward edge of the harrow-blades of the front rank, and an upper triangular web, k', extending horizontally, or at right angles to the body, whereby the cutter may be riveted upon the gang-bar and braced therefrom. These cutters we place alternately with the harrow-blades of the front rank, so that they may cut whatever clods enter between said blades, and thus suitably prepare them for disintegration by the action of the blades of the two gangs.

It will be observed that the clod-cutters K present a vertical cutting-blade from end to end, and that they are adapted to cut the clods cleanly and evenly, but have no crushing action, such as produced by a laterally bent or curved blade.

It will also be noted that the cutters are secured to the gang-bar which carries the forward series of harrow-blades, and that they extend backward between said blades. By this arrangement of the cutters the necessity for a separate bar to carry the cutters is avoided, and the cutters are caused to act upon the clods while said clods are passing between the forward parts of the harrow-blades, and while held thereby against escaping laterally from the cutters, from which it follows that the clods will be cut evenly and certainly before reaching that portion of the harrow-teeth by which the crushing is principally effected.

The arrangement of the cutters between the harrow-blades of the front gang causes them to divide the clods on lines directly in advance of the harrow blades of the rear gang, and consequently the divided clods are acted upon with certainty and to great advantage by the rear gang of harrow-blades.

We are aware that clod-crushers composed of flat bars or runners have heretofore been employed in harrows, and also that harrows have been constructed with inclined rotary cutting-disks taking the place and position of blades. The first of these tend to crowd or pack the clods down into the soil rather than disintegrate them, and the second has no provision for dividing or cutting the clods which enter between the diagonally-set disks. Neither of these do we claim; but What we do claim as our invention is—

1. The combination, with a gang of harrow-blades, of clod-cutters supported from the gang-bar alternately with the blades to divide the clods entering therebetween.

2. In a multiple gang-harrow, the combination, with the front gang-blades, of clod-cutters placed alternately therebetween.

3. The combination, substantially as hereinbefore set forth, with a gang of harrow-blades, of knives riveted to the gang-bar alternately with said blades to divide the clods passing therebetween.

4. The combination, substantially as hereinbefore set forth, with the interdouble gang-bar and with the harrow-blades, of the clod-cutters composed of a single piece of metal bent to afford a vertical blade and diagonal front cutting-edge, and a horizontal web bracing said plate and whereby the cutters are attached to the front gang-bar alternately with the blades.

JOHN T. BELL.
SEBASTIAN RITTY.

Witnesses:
V. WINTERS, Jr.,
JOHN DAVIS.